May 31, 1955      M. J. DIKEMAN      2,709,508
UNIVERSAL HYDRAULIC DRIVE AND CONTROL UNIT
Filed June 30, 1952      5 Sheets-Sheet 1
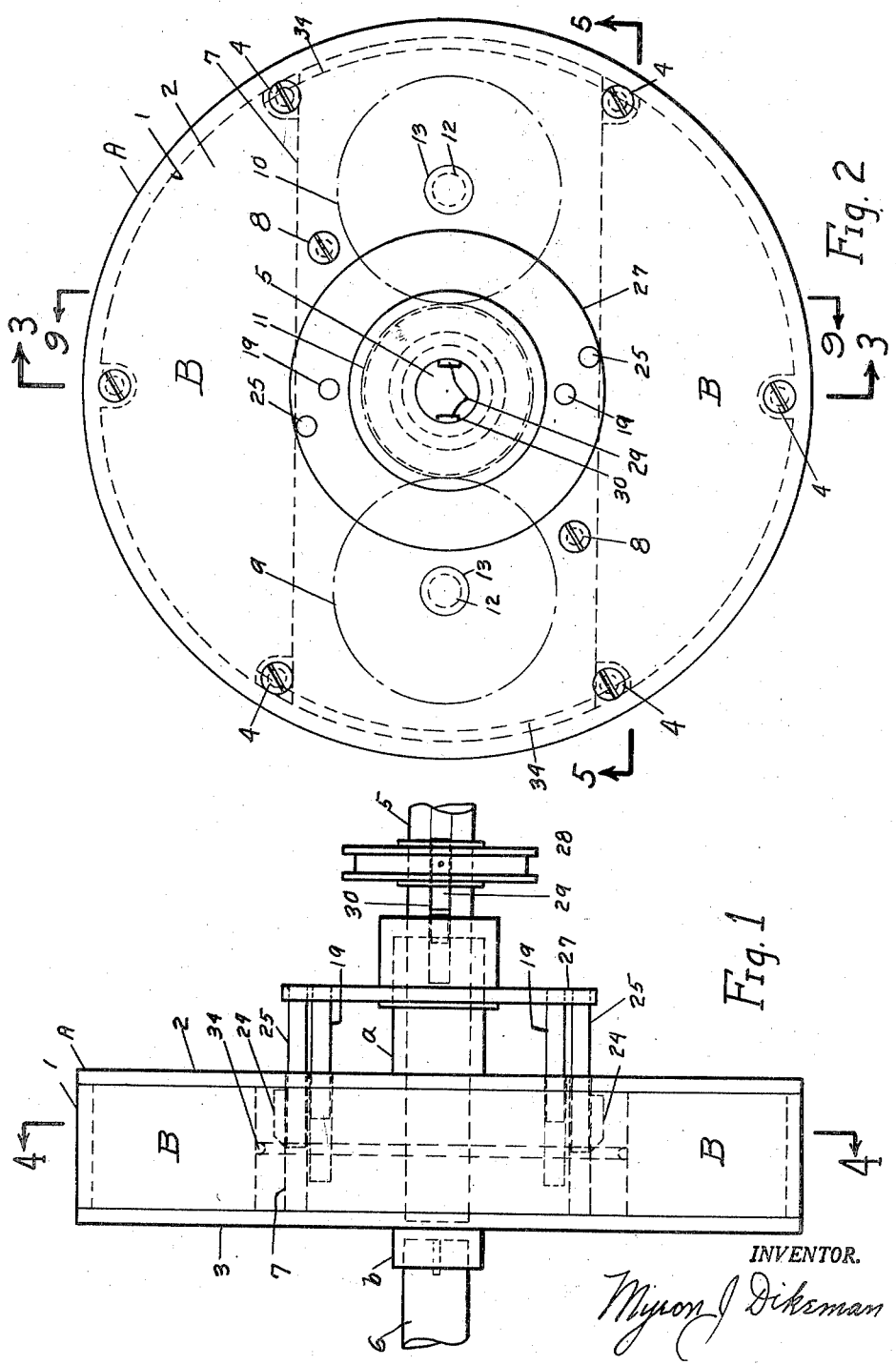
INVENTOR.
Myron J Dikeman

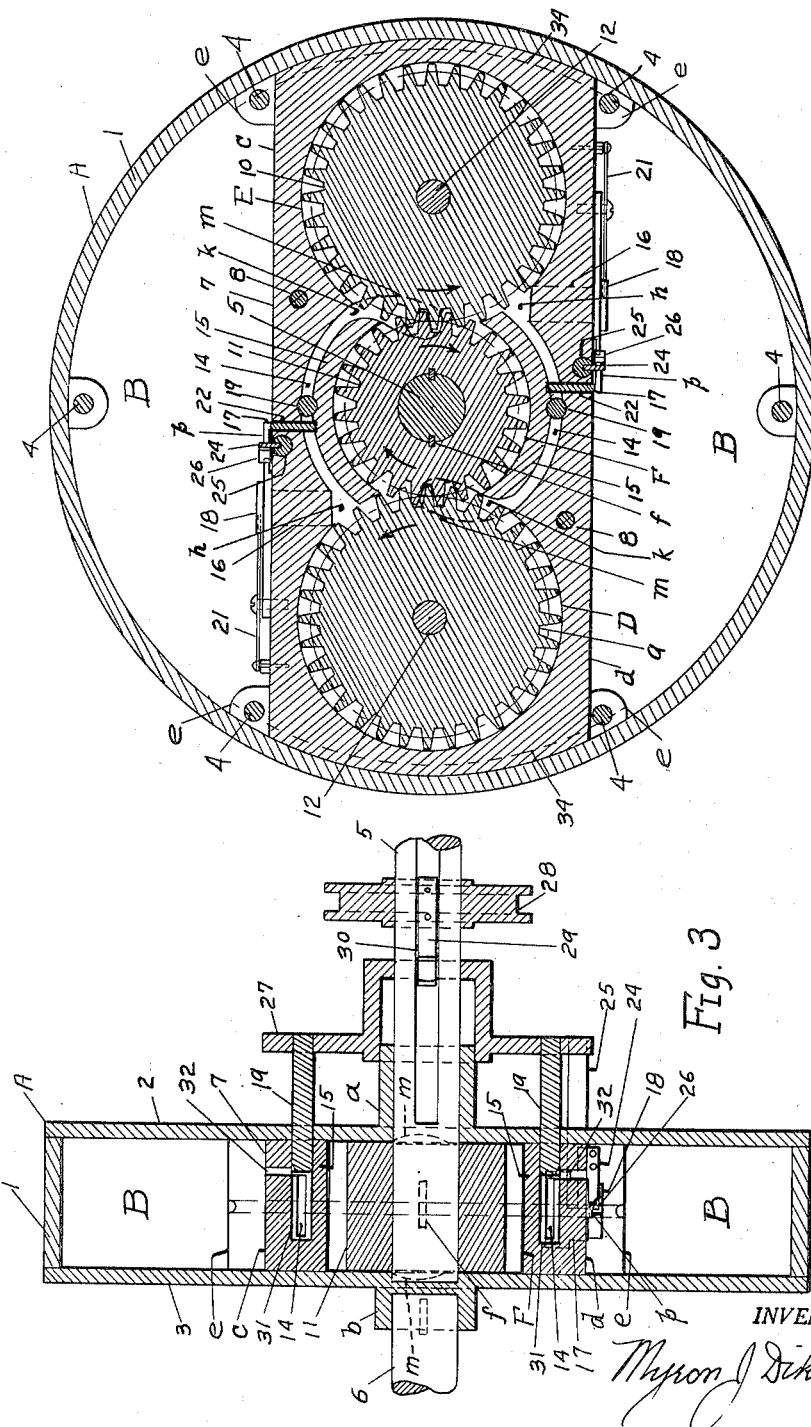

May 31, 1955     M. J. DIKEMAN     2,709,508
UNIVERSAL HYDRAULIC DRIVE AND CONTROL UNIT
Filed June 30, 1952     5 Sheets-Sheet 3
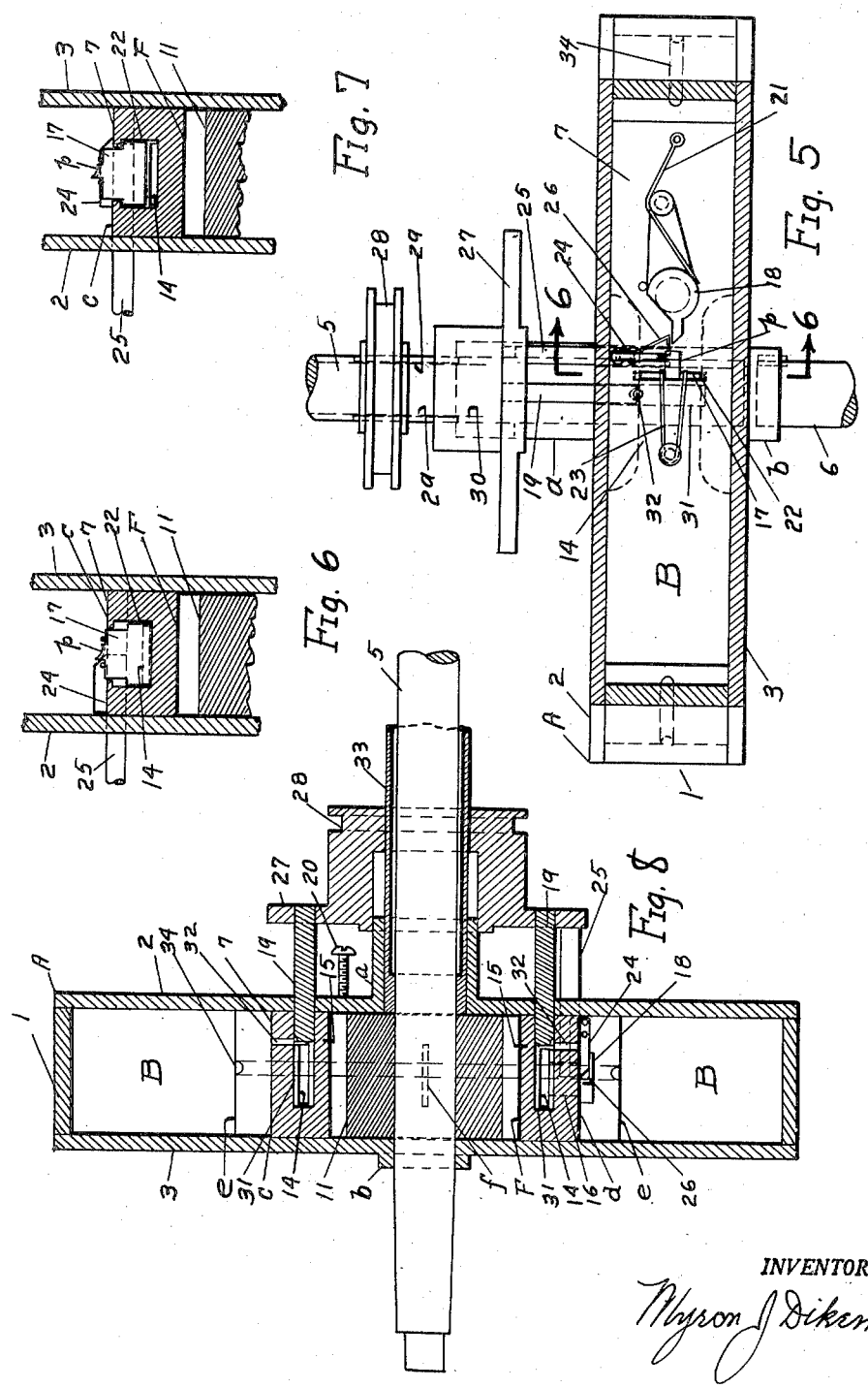
INVENTOR.
Myron J Dikeman

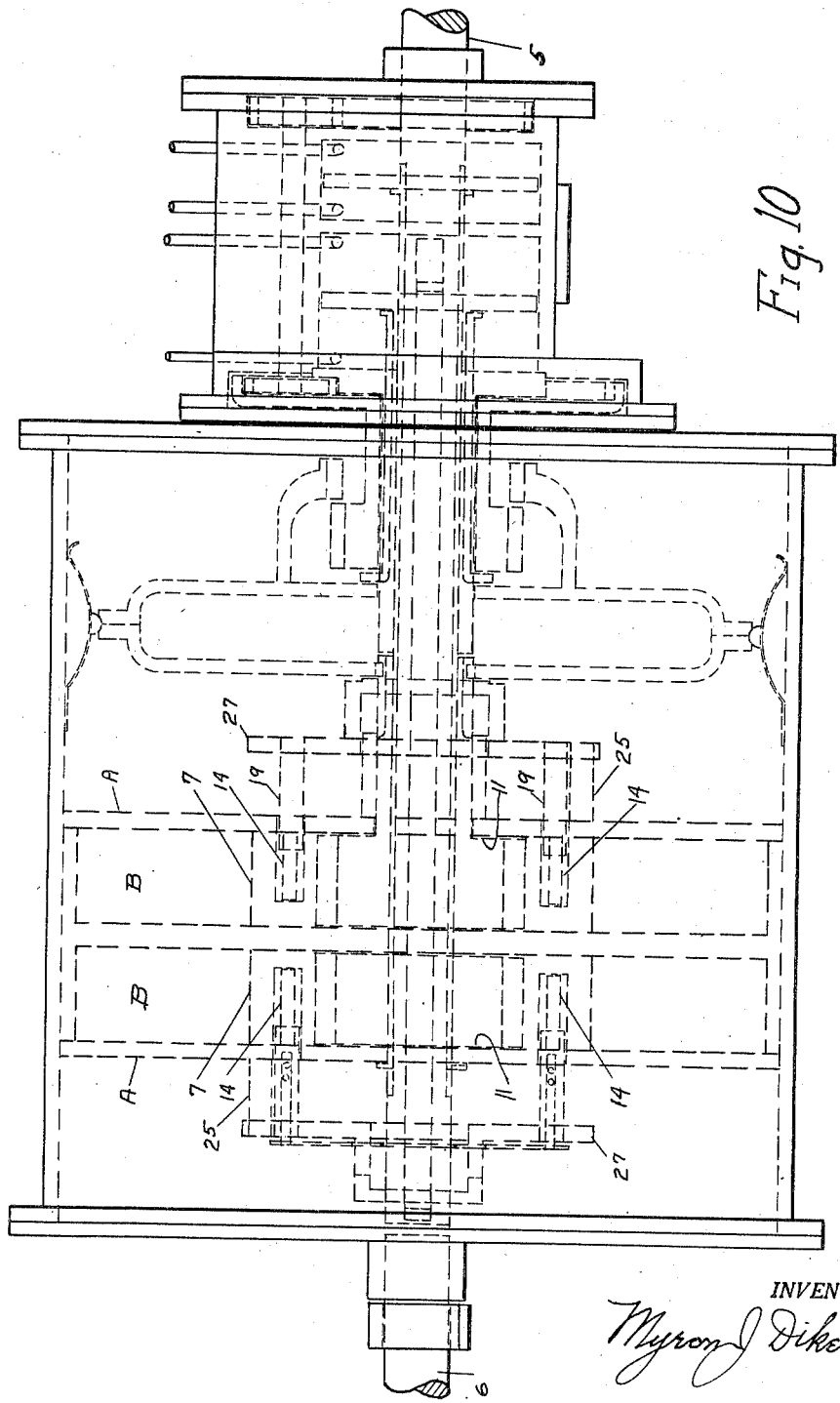

United States Patent Office 2,709,508
Patented May 31, 1955

2,709,508

UNIVERSAL HYDRAULIC DRIVE AND CONTROL UNIT

Myron J. Dikeman, Grosse Pointe Woods, Mich.

Application June 30, 1952, Serial No. 296,444

4 Claims. (Cl. 192—61)

This invention is an improvement of my former patents Re. 23,342 and Pat. No. 2,583,209, and relates to a new structural combination of the old pressure fluid control units and operating mechanism, for producing complete internal fluid flow and control, with full torque multiplication.

The object of my invention is to produce a revised internal flow control unit that may substitute, or replace the old control units of the above mentioned prior patents, and also adaptable as high power wheel brake units for automobiles.

Another object is to produce an improved structural assembly of the former old control unit sections, by special flow channel design directly between the assembled gear teeth intersections, each fully controlled by special, intervening valve mechanism mounted directly within the respective circuits.

A further object is to greatly reduce, or remove, both the fluid back-pressure and friction within the control unit by the new channel arrangement by-passing the drive gear and restricting the entire fluid flow to the idler gears only.

Another object is to instantly expel all pressure fluid from the gear chambers at the release of the operating pedal, producing a partial vacuum for free gear rotation during any engine idling, and likewise instantly refill the respective gear recesses from outside storage chambers, at the starting of any power operation, then immediately close therefrom.

These several objects are attained in the preferred form by the construction and arrangement of parts as are more fully hereinafter set forth.

Similar parts on all drawings are marked by similar numerals or letters.

Fig. 1 is a side elevation of the assembled unit, showing the general arrangement of the exterior parts.

Fig. 2 is an end elevation of the device, showing the relative position of the operating parts.

Fig. 3 is a cross-sectional view taken on the line 3—3 of the Fig. 2, showing the internal drive gear, and the fluid channels with special control valves mounted therein.

Fig. 4 is a further cross-sectional view taken on the line 4—4 of the Fig. 1, showing the relative position of the internal pump gearing and operating mechanism.

Fig. 5 is a cross-sectional view taken on the line 5—5 of the Fig. 2, showing the special port valve operating mechanism, and intervening fluid channel designed between the idler gears.

Fig. 6 is a cross-sectional view taken on the line 6—6 of the Fig. 5, showing the fluid channel closing valve in its "closed" position when the device is not in operation.

Fig. 7 is a further cross-sectional view taken on the same line 6—6 of the Fig. 5, showing the same valve in its "open" position when in full power operation.

Fig. 8 is a cross-sectional view as on the line 3—3 of the Fig. 2, showing the same assembled fluid control valve, as mounted on an automobile rear axle drive shaft, and applied as a special power wheel brake therefor.

Fig. 10 is an assembly diagram of prior patent referred to, illustrating position and connections of this new improved power section, when mounted therein as a replacement unit.

Figure 9:
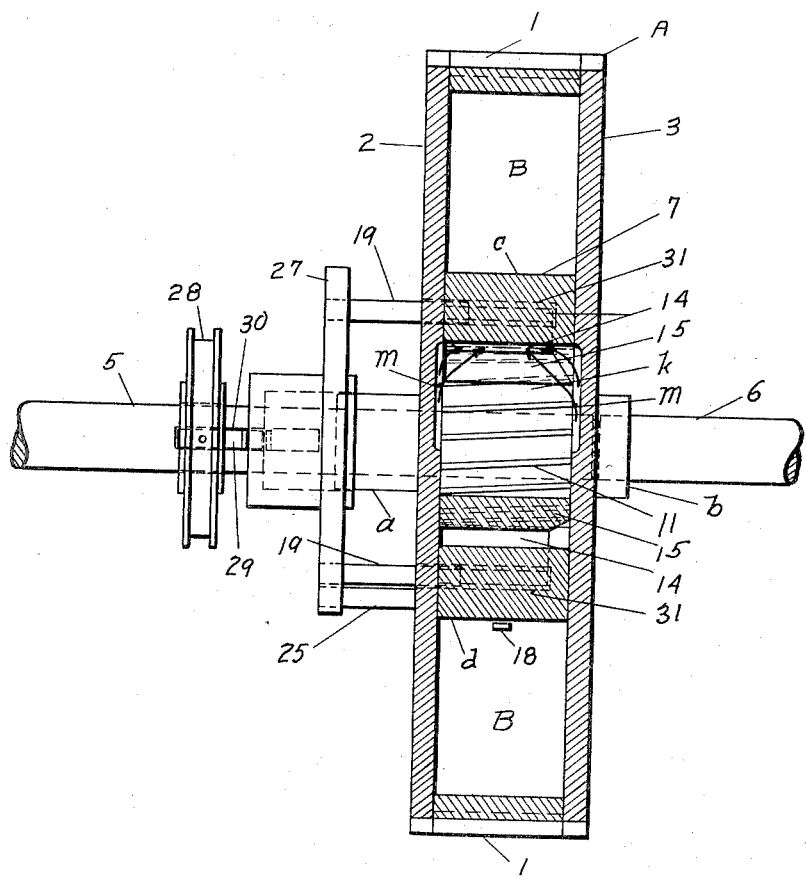
Fig. 9 is a cross-sectional view taken on line 9—9 of the Fig. 2 at the gear intersection point, showing the fluid escape side channels $m$ opening directly into the main fluid flow channel passages.

It is pointed out that all previous fluid clutch devices, are based upon "external fluid flow" principle, i. e., the fluid passing from the outer casing chamber continuously flowing into the operating gears, then back into the outer chamber again with like flow, resulting in a continuous fluid pressure and power energy loss by the release in the open chamber.

My new device is a complete "internal flow" unit during all power operations, and while it receives the operating fluid from external storage chambers, through connecting valved inlet ports, for instant refilling only, said valves are always closed during power operation, retaining full fluid channel pressure for continuous recirculation, and without any energy loss. During all engine idling, the pressure fluid within the gear chambers is instantly discharged back into the storage chambers through valve controlled escape ports 32.

In general, this new device, as in the former mentioned patents, comprise a similar gear assembly, preferably spur gears, inclosed within a surface-fitting, pressure-tight fluid filled casing, rotatably mounted therein, the casing being formed with exterior storage chambers separated therefrom, and designed with curved internal fluid channels directly between the respective gear intersection points, each channel being valve controlled and provided with escape ports 32, and suitable valve operating mechanism for completely "refilling" or "discharging" the operating fluid in the gear chambers, providing instant power means, or free gear rotation at will of the operator.

I will now describe more fully the detailed construction of my device, referring to the drawings and the marks thereon. The device is defined, and illustrated, with attached driven shaft, with hub, but which is omitted when installed within a universal drive assembly casing as already so provided in previously mentioned patent.

The power control unit A comprises a short cylindrical chamber casing 1, having circular head plates 2 and 3 fixedly mounted on opposite ends thereof, by suitable screw bolts 4. The head plate 2 is formed with a central hub bearing $a$ for receiving a drive shaft 5 rotatably mounted therethrough. The head plate 3 is likewise formed with a central bearing hub $b$ for receiving a driven shaft 6 fixedly mounted therein, both bearings and shafts being positioned concentric with the casing axis. Shaft 6 and hub $b$ may be omitted when not required.

Within the cylindrical casing 1 is mounted a flat, elongated gear block 7, formed with opposite parallel sides $c$ and $d$, and of a thickness equal to the cylindrical casing length, and positioned diametrically across said casing chamber, turned and fitted therein, and securely attached by the end lugs $e$. The head plates 2 and 3 are sealed thereon by suitable screw bolts 8, forming separated, sealed, fluid storage chambers B on opposite sides thereof, but completely sealed therefrom. The storage chambers B are connected by intervening end channels 34 formed within the gear block ends.

Within the gear block 7 is mounted a series of outer, flat spur "idler" gears 9 and 10, positioned on opposite sides of a central spur "drive" gear 11, all meshed together and rotatably mounted within adjacent, connecting, surface-fitting, pressure tight cylindrical gear chambers D, E, and F formed through said gear block 7, all positioned with axis of rotation parallel with the casing and drive shaft axis. The central drive gear 11 is fixedly mounted on the drive shaft 5 by suitable keys f, and is rotatable therewith, except when rotated by adjacent shaft member. The idlers 9 and 10 are mounted on short stud shafts 12 which are mounted in special closed bearing recesses 13 formed within the head plates 2 and 3.

While I have only illustrated two "idler" gears in the assembly, it is to be understood that any desired number of "idlers" may be included, depending on the size of the gears, and connected by similar intervening fluid valved channels 14, as described.

Curved internal fluid channels 14 are formed within the surface of the gear block 7 adjacent the drive gear, on each side thereof, and extended between the respective "inlet" and "outlet" gear teeth intersections h and k, providing the internal fluid flow passages between opposite sides of the dual idler gears 9 and 10, and also preventing the pressure fluid from contacting the central drive gear 11 at any time by the intervening chamber rib 15. The pressure fluid enters the respective gear recesses D and E, (at start of operations), through the gear block valve controlled inlet port 16, opening into the gear teeth intersection recess h and entering the idler gear teeth 9 and 10, passing around to the respective gear teeth outlet intersections k where the converging teeth force the liquid directly into the channels 14, (when valves are open), and on to the consecutive idler, so continuing while the channels 14 remain open. At the respective outlet points k, the rib 15 end is cut away sufficiently to allow the expelled fluid escape from the converging gear teeth, aided by the casing side channels m formed within the head plate surfaces, also leading back to the channel openings. Merely a slight gouge in the head plate surfaces as indicated in Fig. 9. The side channels m, could, in some cases, be omitted if desired, if spiral gears should be substituted, and operating conditions allow.

The fluid flow, for power operation, and gear rotation is fully controlled by a quadruple valve operation, which first, instantly closes the escape port 32 and opens the channel "back-flow" valves 17, and simultaneously opens, (and releases), the snap "inlet" valves 18, and with a gradual closing of the power fluid "control" valves 19, all during the same starting pedal operation.

The fluid inlet port 16 is always closed by the spring snap valve 18 pivotally mounted on the gear block edges c and d, closable by the spring 21, when released. The backflow valve 17 is slidably mounted within the gear block wall slots 22, intersecting the respective fluid channels 14, retained in closed channel position by the stressed springs 23, said valve being operated by an engaging "end beveled" slide bar 24 fixedly mounted on an operating slide rod 25, the beveled slide bar end designed for engaging and raising the back-flow valves 17 instantly when advanced under the projected valve lip p. The slide rod 25 is slidably mounted within a tubular recess formed in the gear block wall, and positioned at right angles thereto. Also the slide bar 24 carries an attached spring latch bar 26 fixedly riveted thereto, designed and positioned to contact and displace the snap inlet valve 18, partially opening same, then instantly releasing said valve which then snaps close again over ports 16, as the engaging latch 26 passes, and which on return stroke spring pass said valve lip, and reingages again therewith for any new operation. The control valves 19 are preferably straight cylindrical rod sections slidably mounted within tubular recesses formed in the gear block walls and at right angles thereto, positioned to intercept the respective internal fluid channels 14, forming ports 31 as the valve rod adjustment is made. Each port 31 is provided with a fluid escape port 32 leading to a storage chamber B, open only when valve 19 stands wide open. Both the dual slide valve rods 19 and 25 are fixedly attached to a common valve operating disc 27 slidably mounted on the casing hub a and the drive shaft 5, and positioned during change from neutral to power operation, to simultaneously open the back flow valves, close the escape ports, open and shortly thereafter close the spring valves and progressively close the fluid flow channels by further movement of the control valve, and are movable in unison with disc displacement as may be made by an attached operating fork when mounted within the operating groove-collar 28 also slidably mounted on the drive shaft 5, movable at the will of the operator, and by any suitable connected pedal mechanism. The groove collar 28 is connected to the operating disc 27 by the splined slide bars 29 operatively attached to both members, slidably mounted within the shaft grooves 30.

The several valves herein shown are illustrative of, and include, any suitable type, or design, of valve as may be adaptable thereto for the specific unit requirement, and while I again utilize similar gears, or other parts, as unit elements in my new assembly, yet the new structural combination taken as a whole, which is the invention, is entirely different than in previously mentioned patents.

In operation, the separated storage chambers B are first filled with suitable operating fluid, the valves 17 and 18 being then closed, and the operating valves 19 and escape ports 32 being fully open, the gear chambers D and E with connecting channels 14 stand fluid empty and free during engine idling. Upon any displacement of a connected power operating pedal, (usually the connected engine gas accelerator pedal, for synchronization), the escape port 32 is instantly closed as valve 19 starts operation, also the valves 17 and 18 are simultaneously opened, with the valve 18 immediately closed after instant gear chamber refilling, and as the control valves 19 are being gradually closed, thereby restraining the refilled channeled fluid flow through the gears. While the channels 14 stand fully open the gears rotate freely and unrestrained as during engine idling, but as the fluid flow within said channels and connected gear chambers are restrained by the slowly closing valves 19, the gear rotations are likewise restrained therewith and causing a partial casing rotation in similar proportion, increasing as the fluid flow is decreased, until the valves 19 are fully closed, completely locking said gears, then rotating said casing and attached driven shaft 6, or inclosing assembly casing, directly with the driving unit shaft. When the operating pedal is released, the valves 19 again reopen, and the valves 17 and 18 automatically closed, with all gear chambers and channel fluid being instantly expelled through the opened escape ports 32 back into the storage chambers B by direct reaction of the closed back-flow valves 17. The spur gear "straight teeth," when the gears are united, form sealed contact surfaces throughout, preventing any fluid leakage or pressure energy loss, and form pressure restraining units for power fluid flow. In adopting the engine accelerator pedal as the operating member, synchronizing valve 19 with the engine carburetor valve, the driving power is maintained in direct proportion to any resulting load.

By utilizing the "dual valve" operation with instant closing of the inlet valves 18 and ports 32, thus preventing escape of any pressure fluid or power energy, during operations, all fluid pressure is by-passed around the drive gear 11, continuing at full force on the successive restraining "idler" gears, transferring fluid power torque therethrough, "internally," directly to the inclosing driven casing, very similarly to the old (external) drive belt on an enlarged driven pulley principle, and without any "energy loss," as rotation of the driven casing is reduced. As "power" equals "torque" times "rotations," or, $P = T \times R$ (with no energy loss), any "decrease" of R will automatically increase T, and resulting in full "torque multiplication," the same as in the old gear transmission units, the new "reaction member" being the "idler" gear teeth surfaces, (fluid pistons), and the intervening channeled pressure fluid, operating under high speed rotation.

Bearing in mind a "restrained" moving force is neither "slippage" nor "energy loss," but is an "energy transfer" through the restraining unit, when external valves 18 are closed and the unit is operating at high speed rotation, the "multi-torque" units are then converted from "mechanics" to "hydraulics," reacting in "dynamics," not in "statics," and involve fluid pressure reaction between "pistons" of different surface ratios, (i. e., gear teeth surfaces), and when the "drive" and "idler" gears are inclosed within a surface-fitting fluid pressure casing, the respective gear teeth then become a series of rotating pressure pistons, and when so applied between "drive" and "driven" members, (with an intervening high pressure fluid channel), will react with fluid pressure torque very similarly to a mechanical gear reaction member; and as the intersecting gear teeth surfaces (in high speed rotation), will react to "decrease" on the (—) or converging gear teeth side, and also "increase" on the (+) or diverging gear teeth side, they then simulate, or substitute, for both "small" and "large" (piston) surfaces. As all power energy, and fluid flow, is transferred to the driven member through the idler gears which control both the torque (T) and the revolutions (R) as so delivered, the valved fluid flow allows the idlers to recede and reduce (R), also to "concentrate" the high speed energy to a lower speed torque (T), then reapplying the accumulated energy to the (+) "increase" or "diverging" side of the idler teeth (pistons) thus increasing the torque (T), and which is added to the direct engine power shaft 5 through the idler bearings, thus producing the full torque multiplication without energy loss. There is no "slippage," or energy loss, except during engine idling with no resistance, and until the casing rotation actually starts.

Spiral gear "curved teeth" function under point contact only, due to the tooth curve, allowing slight fluid leakage throughout, and which does effect both the efficiency and the torque multiplication, but which may be mitigated by reduction of the helical tooth angle, and tooth clearance, to a minimum predetermined by fluid flow requirements.

When my device is applied as an automobile wheel brake unit, as illustrated in Fig. 8 and Fig. 9 of the drawings, spiral gears being preferred, the casing hub $a$ is fixedly mounted on the hollow automobile rear axle housing 33, remaining stationary, and the drive shaft 5 (rear auto axle), extended therethrough to project from both sides of the unit A, and for fixedly mounting the automobile wheel thereon, the operating power then coming from the wheel resistance when the brake fluid pressure is restrained by the closing valves 19, yet rotating freely within the empty gear chambers while under actual engine axis driving power. The fluid brake operation of the unit is exactly the same as previously described. But when the unit A is designed for the wheel brake, on automobiles, both ends $h$ and $k$ of the internal channel ribs 15 should be curved (as indicated at point $k$), to allow for "backward," as well as "forward" operations, without gear locking results. If desired, an adjusting screw 20 may be mounted on the casing wall, adjacent the operating disc 27, to regulate the partial valve closing in the channels 14, to prevent actual tire slippage, as caused by fully locked brakes. (For wheel brake assembly, with spiral gears as illustrated in Fig. 9, the normal gear tooth leakage will allow slight wheel rotation, preventing pavement slippage. "Right" and "left" hand units are adaptable on opposite sides of automobile, when applied as wheel brakes thereon. When the unit A is applied to the automobile front wheel, as a brake unit, an extended tubular spindle bearing must be added to the wheel bearing, and projected out for receiving the unit drive gear 11 thereon, or the unit drive shaft 5 formed as a tubular spindle bearing projected from the casing 1, for fixedly mounting the automobile wheel thereon.

While I have again utilized several of the old parts and sections, as elements of my new assembly, yet the structural combination, taken as a whole, is entirely different from the former patented devices.

Having fully described my new universal hydraulic drive and control power unit, what I claim as my invention and desire to secure by Letters Patent is:

1. A fluid power control adapted for drive and control units within a universal fluid drive and control assembly, and used therewith, comprising a closed, cylindrical, fluid filled casing having a drive shaft rotatably mounted through one casing end, and a driven shaft member fixedly mounted at the opposite inclosing casing end, both shaft members being positioned concentric with the casing axis, a gear-block fixedly mounted within the casing, positioned centrally therein, forming separated casing fluid storage chambers on opposite sides thereof, a gear-assembly having a central drive gear, all meshed therewith, rotatably mounted in said gear-block within connected surface-fitting, pressure tight gear chambers formed therein, forming "intake" and "discharge" sections at opposite sides of the respective meshed gear teeth intersections, said control drive gear being fixedly mounted on the drive shaft passing therethrough, curved uniform fluid flow channels with fluid escape ports, formed directly within said gear-block wall forming inner wall ribs with open rib ends, for connecting adjacent "inlet" and "discharge" sections together for continuing the fluid flow around the central drive gear, said fluid channel inner wall rib-end being cut away and curved to the drive gear circumference at the "discharge" gear intersections, to allow the "discharge" fluid escape therethrough, closable valve controlled fluid inlet passages also formed in the gear-block walls, positioned between the respective gear-chamber "inlet" sections and an adjacent external fluid storage chamber, spring valves mounted over the inlet passage ports for instant gear-chamber refilling and valve reclosing, a back-flow valve mounted within the gear-block wall positioned to intercept the fluid flow channel passages, for the closing said fluid flow channels at the end of the power operation and for discharging pressure fluid from gear chambers through escape ports at end of operation and during engine idling, a control-valve mounted within the gear block wall, also positioned to intercept the fluid flow channels and escape ports at predetermined points, for regulating, and closing, the channel fluid flow during power operations, and for releasing the fluid escape port during engine idling, adjustable valve operating mechanism mounted on the shaft and casing walls and positioned during change from neutral to power operation, to simultaneously open the back-flow valves, close the escape ports, open and shortly thereafter close the spring valves and progressively close the fluid flow channels by further movement of the control valves.

2. A fluid drive control adapted for power units within a universal fluid drive and control assembly, and used therewith, comprising a closed, cylindrical casing having a drive shaft rotatably mounted through one casing end, and a driven rotatable member fixedly mounted to the inclosing casing walls, both rotatable members being positioned concentric with the casing axis, a gear-block fixedly mounted within the casing positioned centrally therethrough, forming separated casing fluid storage-chambers on opposite sides thereof, said storage chambers being filled with operating fluid, a triple gear-assembly having a central drive gear, all meshing therewith, rotatably mounted in said gear block within connected surface-fitting, pressure tight, gear chambers formed therein, forming "intake" and "discharge" sections at opposite sides of the respective gear teeth intersections, said control drive gear being fixedly mounted on the drive shaft passing therethrough, curved, uniform fluid flow channels with escape ports formed directly within said gear-block wall forming inner wall ribs with open rib ends, for connecting adjacent "inlet" and "discharge" sections together, by-passing the fluid around the drive gear, the inner channel wall rib-end being cut back and curved at the "discharge" gear intersection to allow discharged fluid escape therethrough, assisted by adjacent head-plate fluid escape grooves, closable spring valve controlled fluid inlet passages also formed within the gear-block walls, positioned between the respective gear-chamber "inlet" intersections and an adjacent separated external fluid storage chamber, spring valves mounted over inlet passage ports for instant gear chamber refilling and valve reclosing, a back-flow valve slidably mounted within the gear-block wall, positioned to intercept the fluid channel passages, for closing the said fluid flow channels at the end of the power operation, and for forcing discharge of fluid from gear chambers through escape ports, at the end of operation or at engine idling, control valves slidably mounted through the gear-block walls, also positioned to intercept the fluid flow channels and escape ports, for regulating, and closing the fluid flow during power operations and to open said gear chamber escape ports during engine idling, dual-valve operating slide mounted within said gear-block, adjacent the inlet and the back-flow valves, engageable simultaneously with both said valves for instant opening of both and immediately closing of said intake valve, and adjustable valve operating mechanism slidably mounted on the shaft and casing walls, and positioned during change from neutral to power operation, to simultaneously open the back-flow valves, close the escape ports, open and shortly thereafter close the spring valves and progressively close the fluid flow channels by further movement of the control valves.

3. A fluid brake control adapted for power wheel brakes for automobiles, and used therewith, comprising a closed, cylindrical casing having a power shaft rotatably mounted through said casing, and a hollow support shaft fixedly mounted on the casing hub wall, both shafts being positioned concentric with the casing axis and with each other, a gear-block fixedly mounted within the casing chamber positioned centrally thereacross, forming separated casing fluid storage chambers on opposite sides thereof, said storage chambers being filled with suitable operating fluid, a gear-assembly, having a central drive gear, all meshed therewith, rotatably mounted in said gear-block within connected surface-fitting, fluid tight, gear chambers formed therein, forming "intake" and "discharge" sections at opposite sides of the respective meshed gear teeth intersections, said control drive gear being fixedly mounted on the casing power shaft, rotatable therewith, uniform fluid-flow channels with escape ports, formed directly within the gear-block face wall, forming inner wall ribs with open rib ends, for connecting adjacent "inlet" and "discharge" sections together, by-passing the fluid around the central drive gear, said fluid channel inner-wall rib ends being cut away and curved at the ends to allow the discharge fluid to escape therethrough assisted by head-plate escape channels, closable spring valve-controlled fluid inlet passages formed in the gear-block walls between the respective gear-chamber "inlet" sections and an adjacent separated external fluid storage chamber, spring valves mounted over inlet passage ports for instant gear chamber refilling and inlet valve reclosing, a back-flow valve mounted within the gear-block wall positioned to intercept the fluid flow channel passages for closing the said fluid flow channels at the end of the power operation and for forcing discharge of fluid from gear chambers through escape ports, a control valve slidably mounted through the gear-block wall also positioned to intercept the fluid flow channels and escape ports, for regulating and closing the channel fluid flow during power operations and to discharge the gear-chamber fluid through the escape ports when returned to free open positions, and adjustable valve operating mechanism mounted on the casing walls and positioned during change from neutral to power operation, to simultaneously open the back flow valves, close the escape ports, open and shortly thereafter close the spring valves and progressively close the fluid flow channels by further movement of the control valves.

4. A fluid brake control device adapted for power wheel brakes for automobiles, and used therewith, comprising a closed, cylindrical casing having a hollow spindle bearing shaft rotatably mounted therethrough, a hollow support shaft fixedly mounted on the casing hub wall, both shafts being concentric with the casing axis and with each other, a gear-block fixedly mounted within the casing chamber positioned centrally thereacross, forming separated casing fluid storage chambers on opposite sides thereof, said storage chambers being filled with suitable fluid, a triple gear-assembly having a central drive gear, all meshing therewith, rotatably mounted in said gear-block within connected surface-fitting, gear chambers formed therein, forming "intake" and "discharge" sections at opposite sides of the respective meshed gear teeth intersections, said drive gear being fixedly mounted on the hollow spindle bearing shaft, rotatable therewith, uniform fluid flow channels with escape ports, formed directly within the gear-block wall forming inner wall ribs with rib ends, for connecting the adjacent "inlet" and "discharge" sections together, by-passing the fluid around the central drive gear, said fluid channel inner-wall rib ends being cut away and curved at the ends to allow the discharge fluid to escape therethrough, closable snap-valve controlled fluid inlet passages formed in the gear-block walls between the respective gear-chamber "inlet" sections and an adjacent separated external fluid storage chamber, spring valves mounted over inlet ports for instant gear chamber refilling and inlet valve reclosing, a back-flow valve slidably mounted within the gear-block positioned to intercept the fluid flow channels for closing the said fluid flow channels at the end of the power operation and for forcing discharge of fluid from gear chambers through escape ports, a control valve slidably mounted through the gear-block also positioned to intercept the respective fluid flow channels and escape ports, for regulating, and closing the fluid flow during power operations, and to discharge the gear-chamber fluid through the escape ports when the valve is returned to its open position, and adjustable disc operating mechanism mounted on the casing walls and positioned during change from neutral to power operation, to simultaneously open the back-flow valves, close the escape ports, open and shortly thereafter close the spring valves and progressively close the fluid flow channels by further movement of the control valves.

References Cited in the file of this patent
UNITED STATES PATENTS

| Re. 23,342 | Dikeman | Feb. 20, 1951 |
| 2,307,676 | Harlan | Jan. 5, 1943 |

FOREIGN PATENTS

| 206,191 | Great Britain | Apr. 26, 1923 |